(12) United States Patent
Gast et al.

(10) Patent No.: US 6,412,816 B1
(45) Date of Patent: Jul. 2, 2002

(54) GAS GENERATOR

(75) Inventors: Eduard Gast, Krailburg a. Inn; Peter Semmler, Aschau a. Inn; Bernhard Schmid, Heldenstein; Maximilian Bergmann, Schwindegg, all of (DE)

(73) Assignee: Contec Chemieanlagen GmbH (DE)

( * ) Notice: Subject to any disclaimer, the term of this patent is extended or adjusted under 35 U.S.C. 154(b) by 0 days.

(21) Appl. No.: 09/889,718

(22) PCT Filed: Jan. 20, 2000

(86) PCT No.: PCT/DE00/00233

§ 371 (c)(1),
(2), (4) Date: Sep. 28, 2001

(87) PCT Pub. No.: WO00/44593

PCT Pub. Date: Aug. 3, 2000

(30) Foreign Application Priority Data

Jan. 27, 1999 (DE) .......................................... 199 03 237

(51) Int. Cl.⁷ ............................................... B60R 21/26
(52) U.S. Cl. ........................ 280/736; 280/740; 280/741; 280/742
(58) Field of Search ................................ 280/741, 736, 280/742, 740

(56) References Cited

U.S. PATENT DOCUMENTS 3,877,882 A * 4/1975 Lette et al. .................... 102/39
4,998,750 A * 3/1991 Werner et al. .............. 280/740
6,189,925 B1 2/2001 Reichtalhammer et al.

FOREIGN PATENT DOCUMENTS

| DE | 41 02 615 A1 | 6/1992 |
| DE | 196 17 249 A1 | 6/1997 |
| DE | 19617249 | * 11/1997 |
| DE | 29821232 | * 5/1999 |
| DE | 298 21 232 U1 | 12/1999 |

* cited by examiner

Primary Examiner—Eric Culbreth
(74) Attorney, Agent, or Firm—Workman, Nydegger & Seeley

(57) ABSTRACT

A pyrotechnical gas generator, preferably for an airbag system, consists of a housing, an ignition unit, a gas generating mixture, a conically shaped cooling system (or cooling and filtering system) tapering in the discharge direction, a gas generating mixture disposed within the cooling system. The housing is preferably one piece and tubular. The combustion gases are discharged through exit ports arranged radially, axially or diagonally on a side of the housing opposite the ignition unit. The cooling system (or cooling and filtering system) separates the gas generator into a combustion chamber, which contains the gas generating mixture and in which a gas is generated by burning the gas generating mixture, and an outflow chamber, through which the cooled (and optionally filtered) gas can flow and the exit through the exit ports. The conical arrangement of the cooling system (or cooling and filtering system) tapering in the discharge direction achieves an optimum effect as regards cooling and filtering, accompanied by a minimum of space requirements and a reduction in weight.

17 Claims, 6 Drawing Sheets

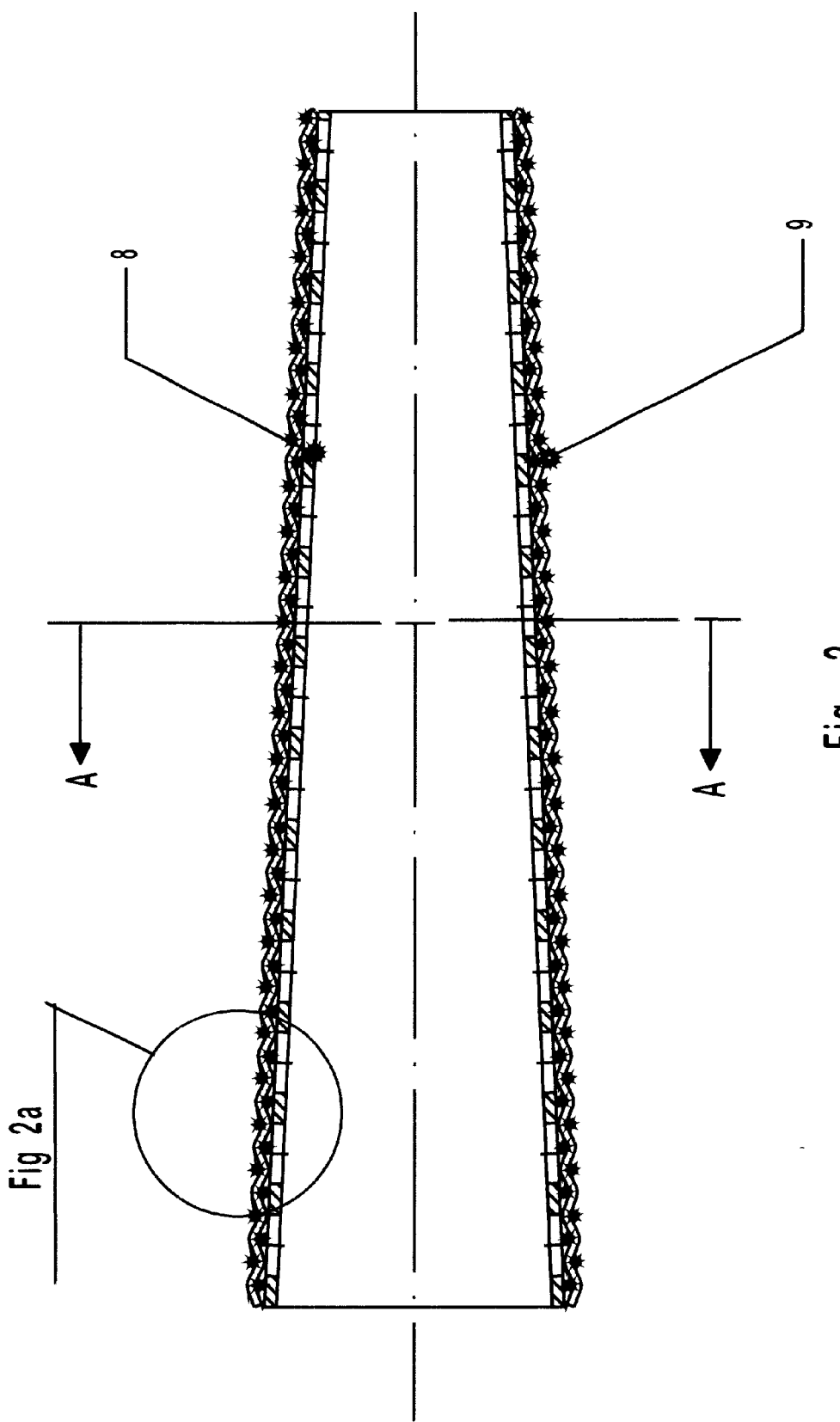

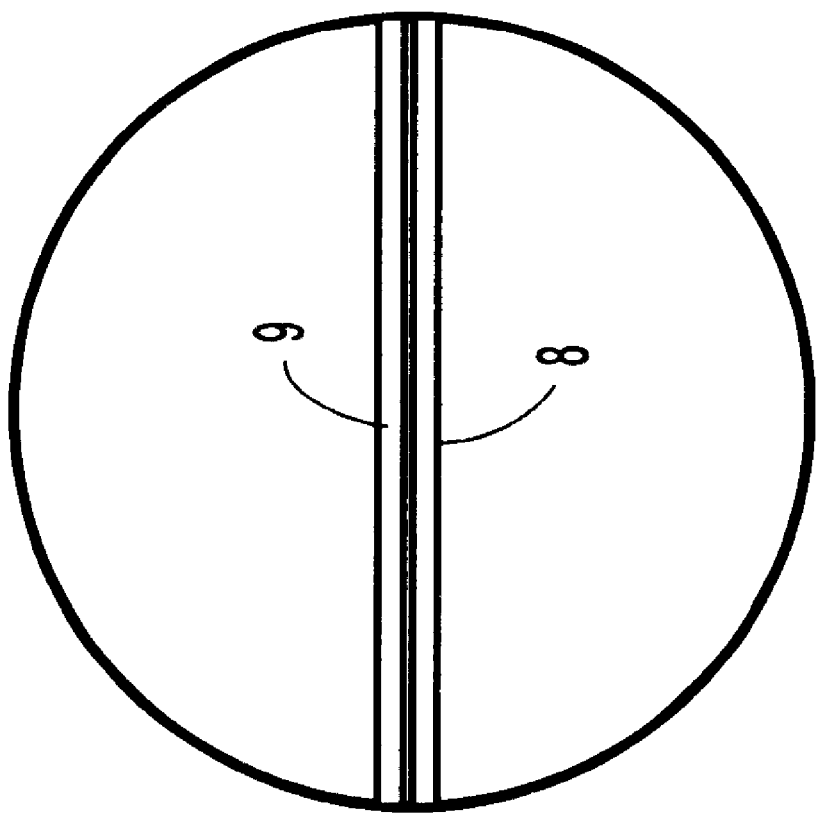

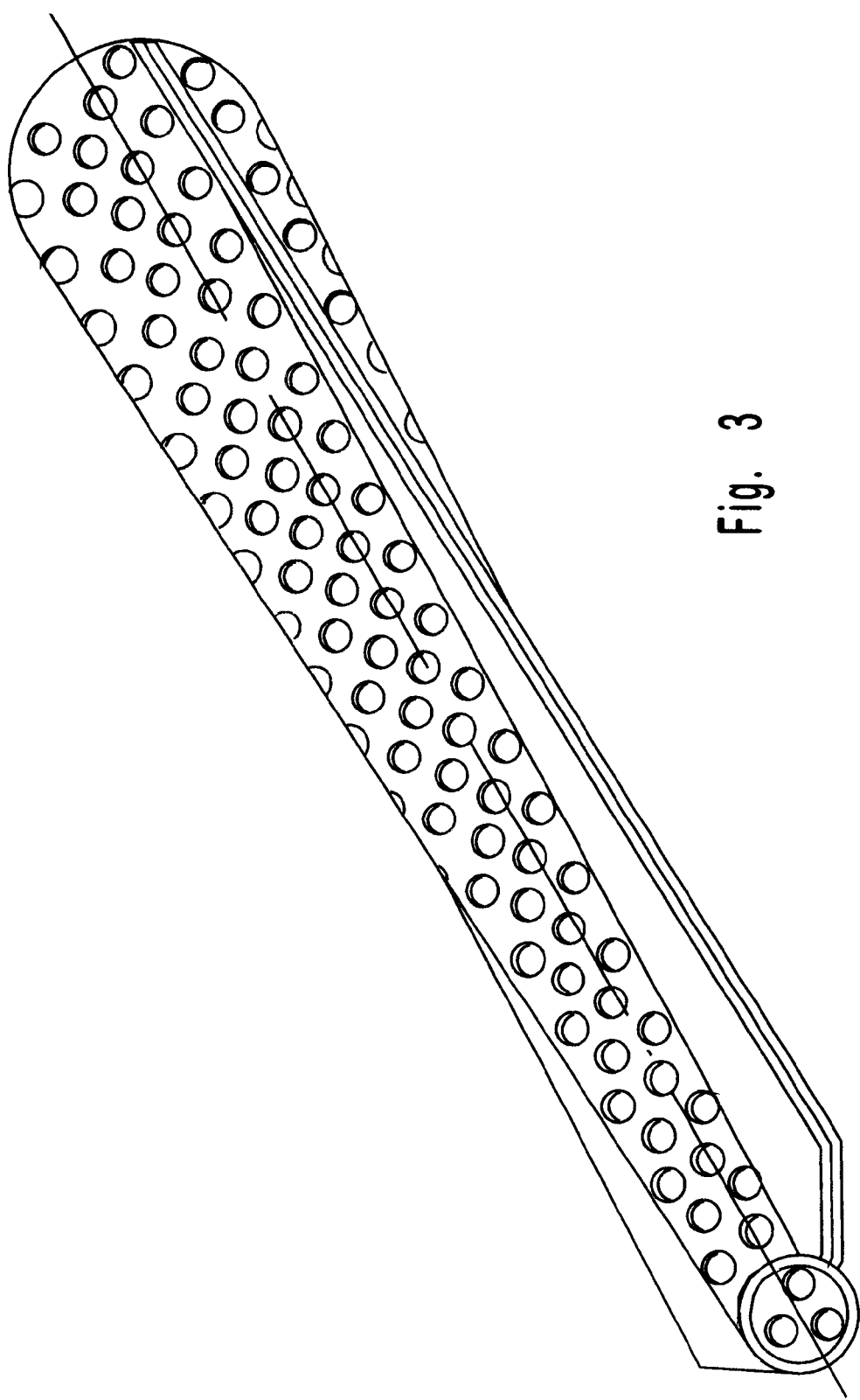

GAS GENERATOR

BACKGROUND AND SUMMARY

Figure 1:
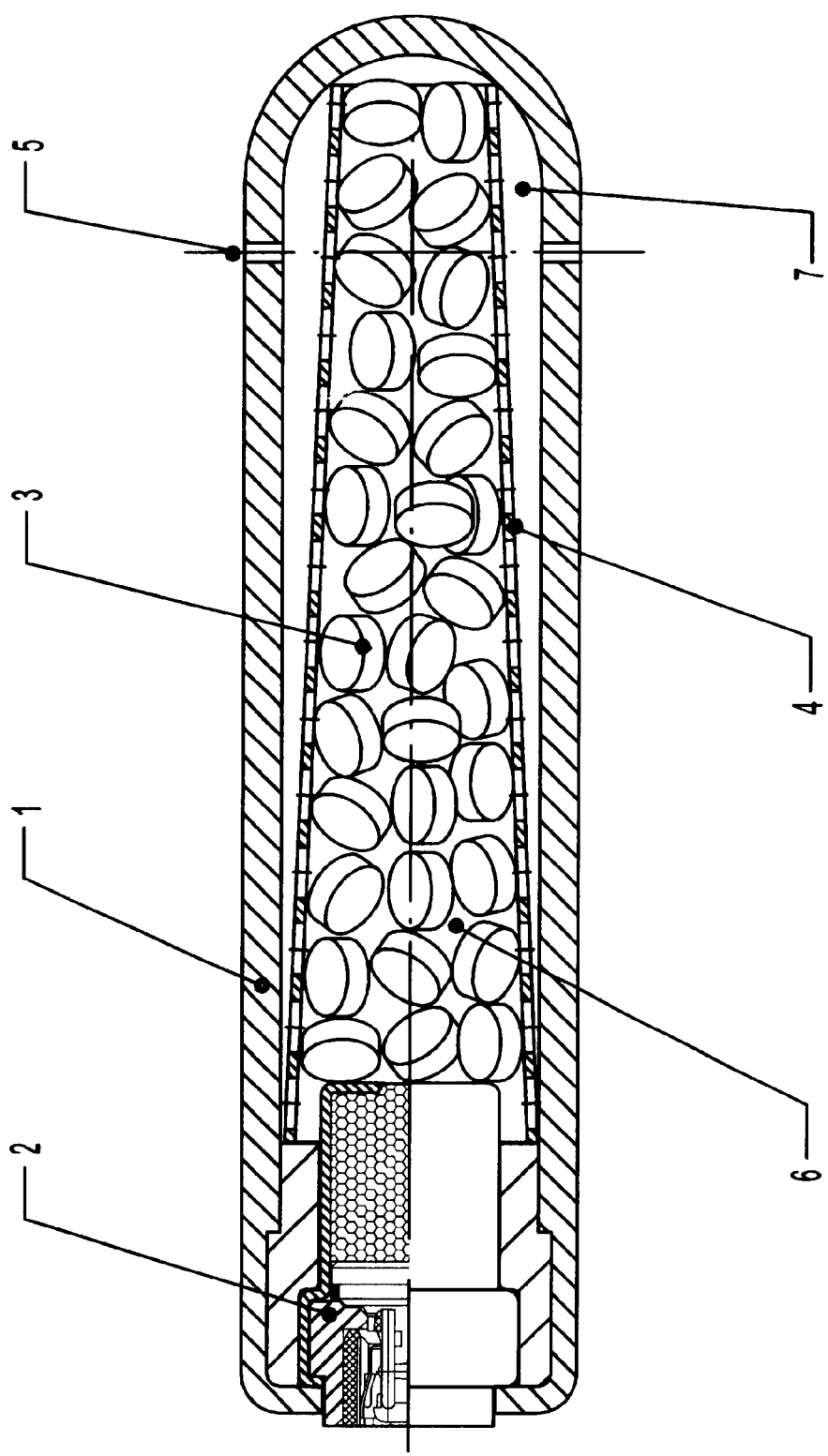

The invention relates to a gas generator on a pyrotechnical basis for the generation of cooled or cooled and filtered gases, preferably for the use in airbag systems, particularly for the use in side airbag systems.

In the case of airbag systems, gas generators of this kind serve for filling the airbag, which then protects the passenger in a collision. Furthermore, such gas generators can be used for filling other devices that require very short reaction and/or filling times.

The ignition unit of the gas generator is ignited by way of a current pulse and then ignites the pyrotechnical gas generating mixture, which, as a rule, burns off under high pressure and provides the required amount of gas. As the combustion of all pyrotechnical mixtures known so far produces not only high-temperature gases but mostly also solid components, it is necessary to cool or cool and filter the combustion gases.

In order to solve this problem, a large number of cooling and filtering arrangements are known, all of which, however, are arranged axially, radially, or axially and radially. DE 196 17 249, for example, describes an axial and radial arrangement of these cooling and filtering elements. These known arrangements of the cooling and filtering systems show the following disadvantages.

If the cooling and filtering system is arranged axially, only a relatively small flow-through cross-section is available, which results in insufficient cooling and bad filtering. In the case of gas generators with small diameters and accordingly great length, this arrangement is disadvantageous because the required free cross-section for the gas flow becomes very small.

If the cooling and filtering system is arranged radially, the problem arises that if the cooling and filtering system is in direct contact with the inner wall of the gas generator housing it is essentially effective only in the area of the exit port, which results in the known problem as described in DE 196 17 249, i. e., the filter material in the area of the exit ports is highly strained. In extreme cases, the filter material is punched or hole patterns may occur therein. In such cases, the gas generated in the combustion chamber can almost freely exit the combustion chamber.

In a spaced arrangement of the radial cooling and filtering system, as described according to the invention of DE 196 17 249, a lot of space is needed. This disadvantage increases as the diameter of the generator decreases, which mandates an increase in the corresponding length.

However, particularly in the case of gas generators for side airbag systems, tubular gas generators of small diameter and correspondingly high length are preferred for reasons of installation.

Thus, it is an object of the present invention to achieve a cooling system, or cooling and filtering system, which enables the design of a gas generator that avoids the aforementioned disadvantages and offers an optimum arrangement of the cooling system, or cooling and filtering system, as regards the space required and the mode of operation.

This object is achieved according to the invention in a surprisingly simple manner in that the cooling system, or cooling and filtering system, tapers, in particular conically, in the discharge direction. Thus, the inner space of the gas generator is separated into two chambers, the combustion chamber containing the gas generating mixture, which is usually present in the form of tablets, but can also be present in the form of granules or the like, and the outflow chamber serving as cooling-off zone for the combustion gases. In the outflow chamber, other deflagration products can be filtered and condensed, too.

The cooling system, or cooling and filtering system, arrangement which, according to the invention, tapers in the discharge direction, in particular conically, the larger cross-section being on the side of the ignitor and the smaller cross-section being on the side of the exit port, serves for achieving that with increasing gas flow in the direction of the exit port, wherein the cooling-off zone gets larger and thus a correspondingly larger outflow chamber is available for the increasing mass flow. Thus, a more constant strain on the cooling system or cooling and filtering system is achieved, too. The cross-section may have a circular, elliptical, square or polygonal shape.

Optionally, the cooling system, or cooling and filtering system, may have 2 or more elements on its outer side that maintain a defined distance and a centered arrangement relative to the inner wall of the gas generator.

Whether only a cooling system or a cooling and filtering system is to be used for the, particularly conical, arrangement according to the invention, which tapers in the discharge direction, depends on the type of the gas generating mixture and the requirement with regard to the admissible amount of particles.

Preferably, the cooling system consists of a grid, a perforated plate, a texture or a sintered material. Depending on the porosity of these materials, apart from the cooling effect, a certain filtering effect is achieved. A further reduction of the particles from the gas flow takes place in the outflow chamber between the cooling system and the inner wall of the generator because particles deposit on the inner wall of the generator, and liquid combustion products that may be present condense on the inner wall of the generator. These effects are supported by the, particularly conical, cooling system, which according to the invention, tapers in the discharge direction. Thus, it is achieved that, with increasing mass flow of the combustion gases in the direction of the exit ports, the flow rate will not increase correspondingly because the increasingly free cross-section in the direction of the exit ports reduces the flow rate.

The cooling and filtering system is either formed by using materials such as grids, perforated plates or texture with small pore size, or sandwich arrangements and multi-layered structures may be employed. Sandwich arrangements of this kind consist of several layers of the same or different materials with the same or different pore sizes. In one embodiment, the cooling system, or cooling and filtering system, has a multi-layered design with a coarse-pored structure (e.g. aperture blind) on the inside and a fine-pored structure (e.g., texture) on the outside. In another embodiment, the cooling system, or cooling and filtering system, comprises a multi-layered design with a fine-pored structure on the inside and a coarse-pored structure on the outside. Here, the term "inside" designates the area facing the combustion chamber. The term "outside" designates the area facing the inner wall of the gas generator.

All of the above described advantages of the, particularly conical, arrangement which, according to the invention, tapers in the discharge direction apply, of course, to cooling and filtering systems in sandwich designs of this kind.

The invention is shown in the following non-restricting embodiments by means of drawings and explained in more detail in the following specification.

FIG. 1 shows, by way of diagram, a side view of an embodiment of a gas generator according to the invention and is not necessarily to scale. In particular, FIG. 1 shows a gas generator which essentially consists of a housing 1, an ignition unit 2, a gas generating mixture 3 in the form of tablets, and a cooling system or cooling and filtering system 4 containing the gas generating mixture 3.

FIG. 2 shows, by way of diagram, a side view of a multiple layer conical cooling or cooling and filtering system according to the invention.

FIG. 2a schematically shows an enlarged view of the circled portion in FIG. 2 illustrating alternate embodiments of the multiple layer cooling and filtering systems according to the invention.

FIG. 3 shows, by way of diagram, a perspective view of a single layer conical cooling cooling and filtering system according to the invention.

Figure 4:
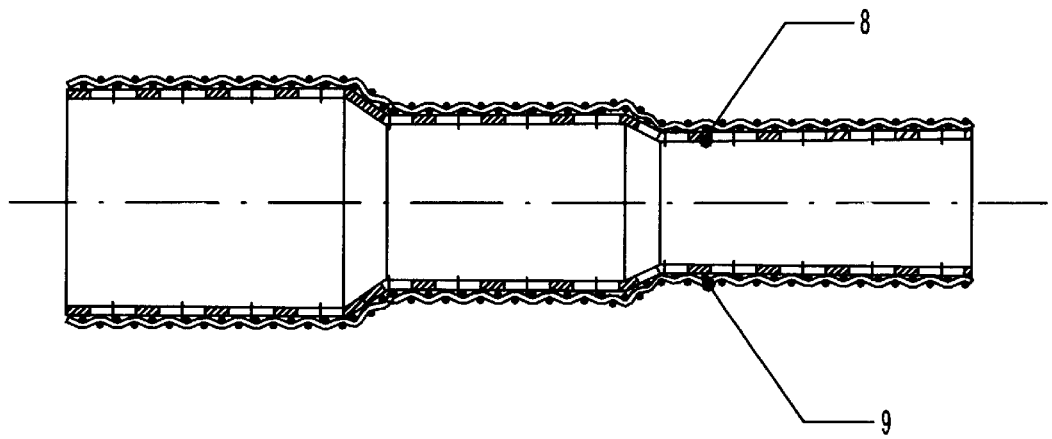

FIG. 4 schematically illustrates a cooling and filtering system in which only a portion is tapered toward the discharge end.

Figure 5:
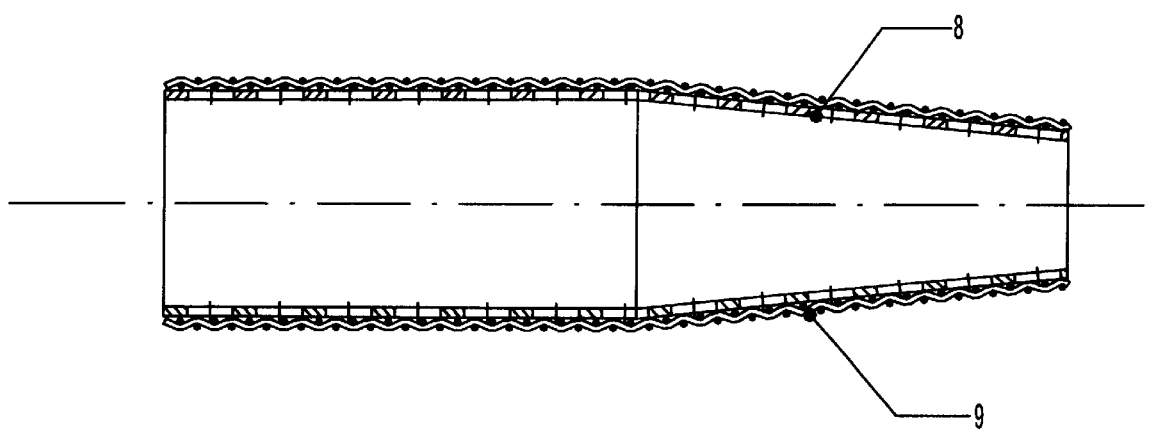

FIG. 5 schematically illustrates a cooling and filtering system in which only a portion is conical.

FIG. 6a–6d schematically illustrate various alternative embodiments of cross section of the cooling or cooling and filtering system shown in FIG. 2 taken along cutting line A–A.

DETAILED DESCRIPTION OF PREFERRED EMBODIMENTS

The gas generator housing 1, which is preferably one-piece and tubular, consists of a suitable pressure and temperature resistant material, preferably of a steel or aluminum alloy. Exit ports 5 are located on one end, which can be arranged radially as shown, axially, or diagonally. The exit ports 5 are closed by means of a sheet, particularly a metal foil or thin-walled metal cap (not shown), to prevent the penetration of humidity. On the opposing end, the gas generator housing 1 receives an ignition unit 2 and is closed by means of a suitable method, e.g., by beading. The cooling system or cooling and filtering system 4, conically shaped and located in the gas generator, separates the inner space of the gas generator into a combustion chamber 6, which contains the gas generating mixture 3, and an outflow chamber 7, which represents a cooling-off zone through which the combustion gases flow out at a relatively slow velocity after passing through the cooling system or cooling and filtering system 4 and then can exit the gas generator through the exit ports 5.

The gas generator is activated by a current pulse igniting the ignition unit 2. The ignition unit 2 consists, for example, of an ignition tablet that can be activated electrically and by a subsequent conventional ignition sequence that is designed to guarantee a safe and short ignition of the gas generating mixture 3. The gas resulting from the combustion of the gas generating mixture 3 flows through the cooling system or cooling and filtering system 4 and, having passed through the outflow chamber 7, exits the gas generator through the exit ports 5 to then fill, e.g., an air bag (not shown). The cooling system, or cooling and filtering system, serves for cooling down the hot combustion gases and, if necessary, for retaining solid particles so that the combustion gases have the temperature and purity necessary for their use.

FIG. 2a schematically illustrates embodiments of a multiple layer cooling or cooling and filtering system in which at least some of the layers may be of the same material. The cooling system of FIG. 2a may also include a coarse-pored structure on an inner side and a fine-pored structure on the outer side, or vice versa. The multiple layers may have each have similar pore sizes and have at least some of the layers be made of different materials.

FIG. 4 schematically illustrates an embodiment of the invention in which only a portion of the cooling or cooling and filtering system is tapered toward the discharge end.

FIG. 5 schematically illustrates an embodiment of the invention in which only a portion of the cooling or cooling and filtering system is conical.

Figure 6A:
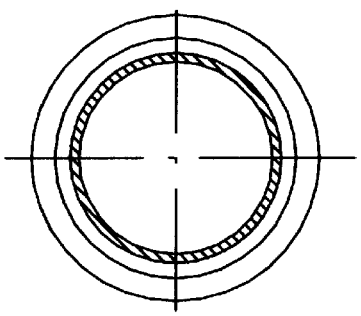

FIG. 6a schematically illustrates a cooling or cooling and filtering system having a circular cross-sectional shape.

Figure 6B:
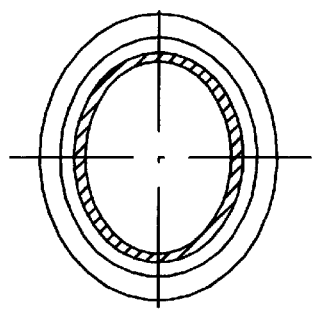

FIG. 6b schematically illustrates a cooling or cooling and filtering system having an elliptical cross-sectional shape.

Figure 6C:
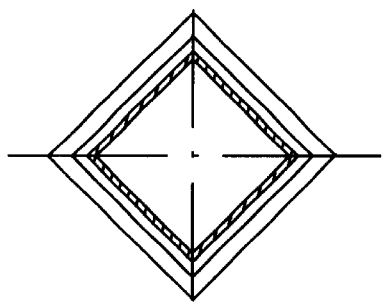

FIG. 6c schematically illustrates a cooling or cooling and filtering system having a square cross-sectional shape.

Figure 6D:
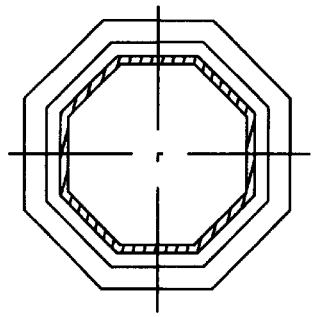

FIG. 6d schematically illustrates a cooling or cooling and filtering system having an diagonal cross-sectional shape.

We claim:

1. A gas generator, comprising:
   a housing defining an interior and having an ignition end and a discharge end,
   an ignition unit disposed within the interior of the housing at the ignition end,
   at least one discharge opening disposed at or near the discharge end of the housing and communicating between the interior and an exterior surface of the housing,
   a cooling system disposed within the interior of the house, at least a portion of which is tapered so as to generally decrease in diameter toward the discharge end, and
   a gas generating mixture disposed within the cooling system.

2. The gas generator according to claim 1, wherein at least a portion of the cooling system is conically shaped.

3. The gas generator according to claim 1, wherein the cooling system includes at least one of a grid, a perforated plate, a texture or a sintered material.

4. The gas generator according to claim 1, wherein the cooling system comprises multiple layers, with at least some of the layers being of the same material.

5. The gas generator according to claim 4, wherein the multiple layers each have similar pore sizes.

6. The gas generator according to claim 1, wherein the cooling system includes a coarse-pored structure on an inner side and a fine-pored structure on an outer side.

7. The gas generator according to claim 1, wherein the cooling system includes a fine-pored structure on an inner side and a coarse-pored structure on an outer side.

8. The gas generator according to claim 1, wherein only a portion of the cooling system is tapered toward the discharge end.

9. The gas generator according to claim 1, wherein only a portion of the cooling system is conical.

10. The gas generator according to claim 1, wherein the cooling system has a circular, elliptic, square or polygonal cross-sectional shape.

11. The gas generator according to claim 1, further including 2 or more spacing elements disposed between an outer surface of the cooling system and an inner wall of the housing so as to position the cooling system within a defined spaced apart and centered arrangement relative to the inner wall of the housing.

12. The gas generator according to claim 1, wherein the housing comprises a one-piece tubular structure.

13. An airbag system comprising a gas generator according to claim 1.

14. A side airbag system comprising a gas generator according to claim 1.

15. The gas generator according to claim 1, wherein the cooling system is further configured so as to provide filtration of particles generated by combustion of the gas generating mixture.

16. The gas generator according to claim 1, wherein the cooling system comprises multiple layers, with at least some of the layers being of different materials.

17. The gas generator according to claim 16, wherein at least some of the multiple layers have different pore sizes.

* * * * *